United States Patent [19]
Martin

[11] Patent Number: 4,799,860
[45] Date of Patent: Jan. 24, 1989

[54] WIND-ENERGY CONVERTER

[75] Inventor: Michael Martin, Darmstadt, Fed. Rep. of Germany

[73] Assignee: Herter Rotor Marketing Division & Co. Beteiligungsgesellschaft mbH, Frankfurt, Fed. Rep. of Germany

[21] Appl. No.: 5,441

[22] PCT Filed: Mar. 27, 1986

[86] PCT No.: PCT/EP86/00190
§ 371 Date: Dec. 4, 1986
§ 102(e) Date: Dec. 4, 1986

[87] PCT Pub. No.: WO86/05846
PCT Pub. Date: Oct. 9, 1986

[30] Foreign Application Priority Data

Apr. 4, 1985 [DE] Fed. Rep. of Germany ....... 3512420

[51] Int. Cl.$^4$ .................................................. F03D 3/06
[52] U.S. Cl. ..................... 416/119; 416/139; 416/DIG. 8
[58] Field of Search ............. 416/119, 139 A, DIG. 8

[56] References Cited

U.S. PATENT DOCUMENTS

| 4,048,947 | 9/1977 | Sicard | 416/119 X |
| 4,105,363 | 8/1978 | Loth | 416/41 |
| 4,334,823 | 6/1952 | Sharp | 416/139 A X |
| 4,415,312 | 11/1983 | Brenneman | 416/139 A X |

FOREIGN PATENT DOCUMENTS

| 1045038 | 12/1978 | Canada | 416/139 A |
| 2602380 | 9/1978 | Fed. Rep. of Germany | 416/119 |
| 2831731 | 2/1979 | Fed. Rep. of Germany | 416/119 |
| 2816026 | 10/1979 | Fed. Rep. of Germany | 416/119 |
| 3304944 | 8/1984 | Fed. Rep. of Germany | 416/119 |
| 530231 | 12/1921 | France | 416/119 |
| 1341652 | 9/1963 | France | 416/139 A |
| 2392249 | 1/1979 | France | 416/139 A |
| 2481756 | 11/1981 | France | 416/139 A |
| 2541733 | 8/1984 | France | 416/139 A |
| 598489 | 4/1978 | Switzerland | 416/119 |

OTHER PUBLICATIONS

Article, "Wind-Energiesysteme" (12 pages).

Primary Examiner—Everette A. Powell, Jr.
Attorney, Agent, or Firm—Burns, Doane, Swecker & Mathis

[57] ABSTRACT

A wind energy converter with a rotor having a vertical swivelling axis has on each rotor arm a vertical vane that is supported so as to be able to pivot about an approximately vertical pivotting axis on the leading edge of the vane. A balance weight is installed in a vane nose section that is located ahead of the leading edge of the vane. The overall center of gravity of the mass of the body consisting of the vane and the balance weight is located ahead of the swivelling axis of the vane. The vane is made with an assymetrical airfoil section. The vane adjusts to the particular optimal angle of attack in the course of each rotation of the rotor. The wind energy converter has a high degree of efficiency at low and medium relative velocity values, and is self-starting.

4 Claims, 2 Drawing Sheets

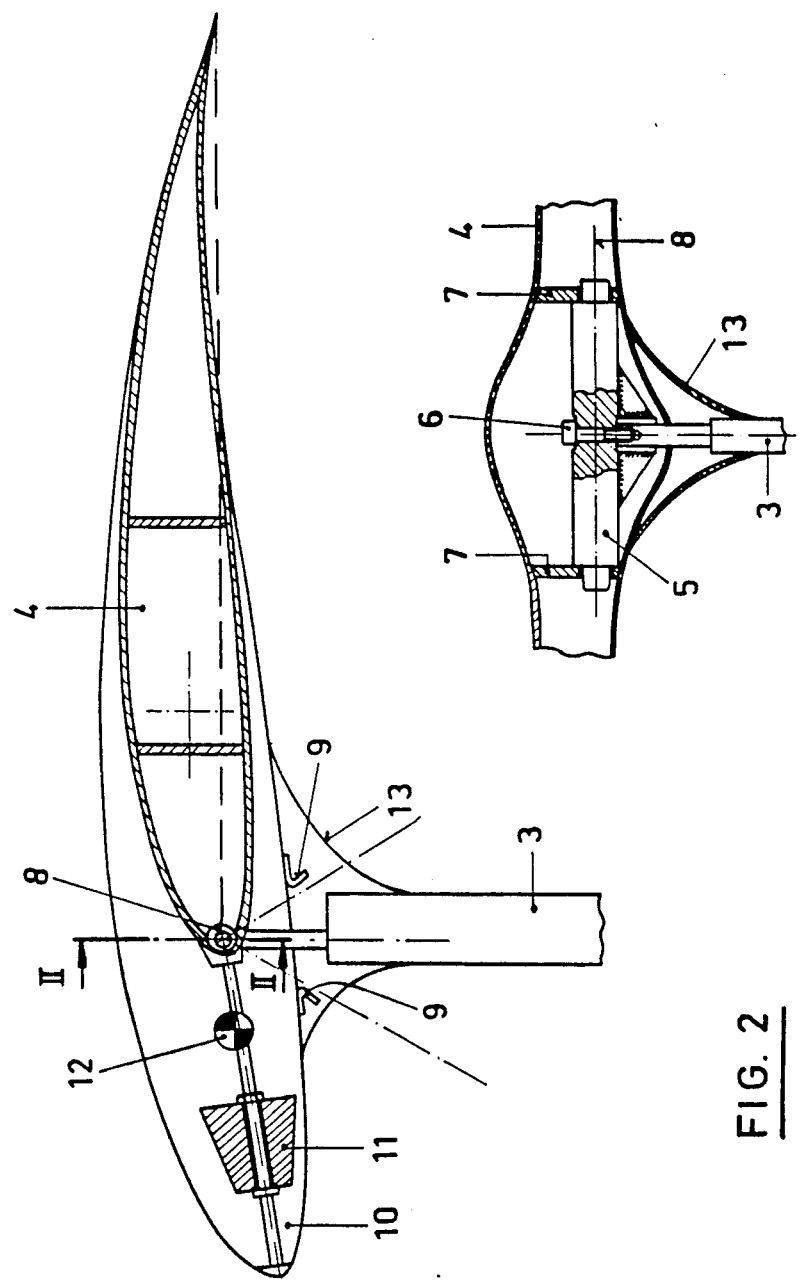

WIND-ENERGY CONVERTER

BACKGROUND OF THE INVENTION

The present invention relates to a wind energy converter having a rotor with a vertical swivelling axis and at least one almost vertical propulsive vane mounted on a rotor arm so as to be able to pivot freely about an almost vertical swivelling axis. A balance weight is connected rigidly to the vane ahead of the vane in the direction of rotation.

Numerous versions of wind energy converters with vertical rotor axes are known. They offer the advantage that they are independent of the direction of the wind and can thus be constructed for relatively low construction costs since there is no need to adjust them to accomodate a change in wind direction. A fundamental disadvantage of this type of wind energy converter is that the air-flow angle of the fluctuates between a maximum and a minimum value during each revolution of the rotor. This change in air-flow angle increases with lower relative velocity values. The relative velocity value is the relationship between the wind velocity and the rotational velocity of the rotor.

Mechanical or other positive control systems that vary the angle of attack of the rotor during each rotation of the rotor so as to match it to the air-flow angle are extremely costly from the point of view of their mechanics and require a relatively large amount of energy; in addition, the particular wind direction has to be considered with this control system.

Rigid installation of the vanes on the rotor arms, which thus dispenses with adjustment of the angle of attack to the varying air-flow angle leads to a considerable loss of efficiency of the wind energy converter, since the greatest possible propulsive force on the vane can only be achieved if the angle of attack for the air-flow angle that is effective at any particular moment is at the optimum value. Assymetrical vane airfoil sections that result in a higher propulsive force and thus greater rotor efficiency cannot be used in the range of small relative velocity values since the airflow breaks down completely with large changes in the air-flow angle. For this reason, up to now it has only been possible to use symmetrical airfoils in these ranges, although these are of very low efficiency. Even with these, in the range of the smaller to medium relative velocity values there is still the disadvantage that the change in the air-flow angle will lead in part to separation of the airflow and thus to increase flow resistance during partially diminishing propulsion, which means that the overall efficiency of the wind energy converter will be greatly reduced.

In a known wind energy converter of the kind described in the introduction hereto (DE-AS No. 26 02 380) the vanes are supported on the rotor arms so as to be able to swivel freely and can thus adapt to the constantly changing air-flow angle during every rotation of the rotor. Since the swivelling axis of the vane lies approximately on the leading edge of the vane and thus in front of the centre of gravity of the vane, a balance weight is provided ahead of the swivelling axis, and this offsets the effect of centrifugal force; the swivelling axis lies at the overall centre of gravity of the mass of the body that consists of the vane and the balance weight.

In this known wind energy converter the centrifugal force that is dependent on the rotational speed has no effect on the angle of attack of the vane; the angle of attack changes only under the influence of the flow forces that are effective to a value that results, however, in no optimal propulsive force and thus no favourable degree of efficiency. For this reason, the vane of this known wind energy converter can only be built with symmetrical airfoil sections, and this results in a very low degree of efficiency.

For this reason, it is the task of the present invention to so configure a wind energy converter of the type described in the introduction hereto that it will start to rotate on its own, and that a good degree of efficiency will be achieved, in particular at low and medium relative velocity values.

SUMMARY OF THE INVENTION

This task has been solved according to the present invention, in that the vane is of an asymmetrical airfoil section and in that the overall centre of gravity of the overall of the body that consists of the vane and the balance weight lies ahead of the swivelling axis, viewed in the direction of rotation.

The displacement of the centre of gravity of the overall mass to a position ahead of the swivelling axis leads to the fact that the vane attempts to set itself to a greater angle of attack as the rotational speed increases. The forces that are generated by the effects of centrifugal force at greater rotational speeds act against the flow forces; when the forces are in equilibrium the vane takes up the angle of attack most favourable for the air-flow angle at any given time. Because of this, and because of the use of an assymetrical airfoil section that is now possible, a greatly increased degree of lift is achieved.

The lift force that acts on the asymmetrical vane airfoil section and the aerodynamic moment are linearly dependent on the angle of airflow in the range of the adjacent flow. At the same time, a centrifugal force is acting on the vane. Since lift, vane moment and centrifugal force depend quadratically on the particular velocities it is possible to achieve an equilibrium at each velocity and thus at each air-flow angle that occurs during rotation, and this equilibrium can be affected by displacement of the balance weight. Even in the range of medium to small relative velocity values it is possible to avoid separation of the flow in that the angle of attack will follow the particular airflow conditions. Only by this means is it possible to use asymmetrical airfoil sections; this display a significant increase in performance vis-a-vis symmetrical airfoils since greatly increased lift coefficients can be achieved for the same air-flow angles.

The use of assymetrical airfoil sections for the vanes of wind energy converters is known (DE-OS No. 28 16 026); however, these vanes are secured rigidly to the rotor arms and for this reason do not permit matching to the varying air-flow angles. For this reason, in these known wind energy converters, too, only a very special airfoil section is used, which is less sensitive to variations in air-flow angle, and the degree of efficiency of which is very low.

According to a preferred version of the concept of the present invention, it is foreseen that the overall centre of gravity is at most 20% of the average vane chord ahead of the swivelling axis.

BRIEF DESCRIPTION OF THE DRAWINGS

The invention will be described in greater detail below, on the basis of an exemplary version illustrated in the drawings appended hereto. These drawings are as follows:

FIG. 2: An enlarged cross-section on the line II—II in FIG. 1;

FIG. 3: A cross-section on the line III-III in FIG. 2.

DETAILED DESCRIPTION OF A PREFERRED EMBODIMENT OF THE INVENTION

Figure 1:
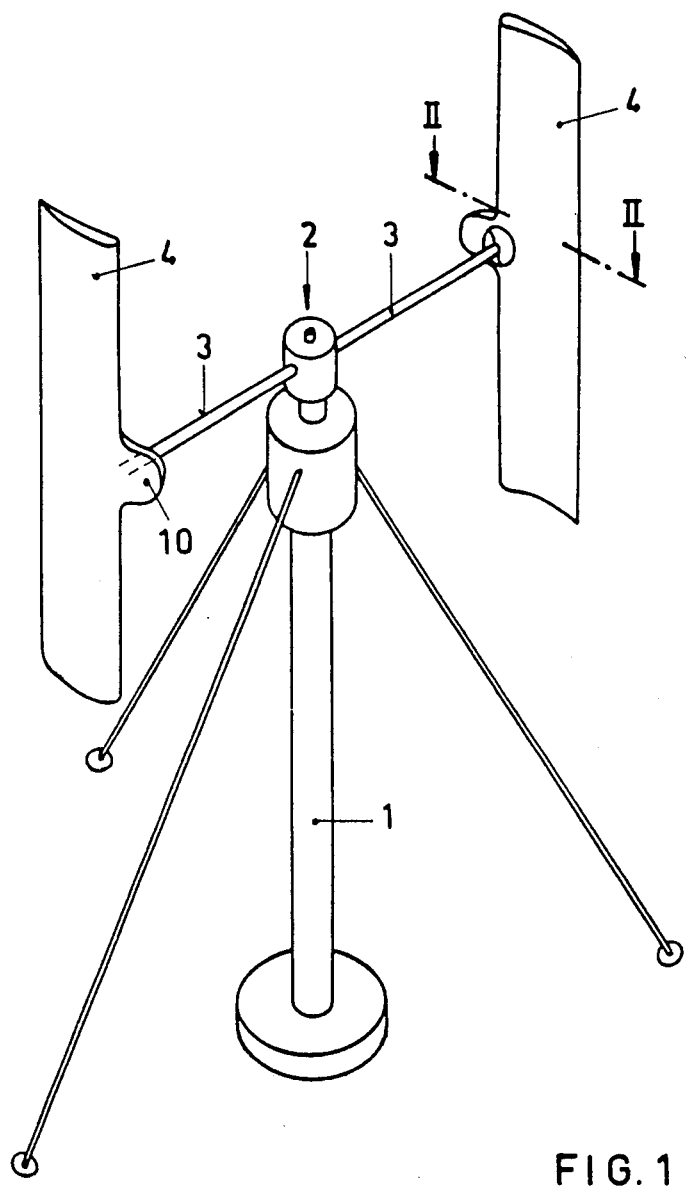
FIG. 1: A perspective and simplified view of a wind-energy converter.

The wind energy converter that is shown in FIG. 1 has a rotor 2 that is mounted on a tower 1; this rotor 2 has a vertical axis which, in the version that is shown in the drawing, has two horizontal rotor arms 3, a vane 4 being mounted at the end of each arm 3.

The vane 4 (see FIG. 2), that can be constructed in any conventional manner, for example, of plastic, fibre composite, metal, or wood, is arranged vertically and is at its center mounted on a vertical supporting shaft 5 so as to be able to pivot; this shaft 5 is connected to the rotor arm 3 by means of a screw 6 (FIG. 3). A both its ends the shaft 5 is supported in a force-transfer rib 7 of the vane 4. The swivelling axis 8 formed thereby lies approximately on the leading edge of the vane 4. The ability of the vane 4 to pivot about the axis 8 is restricted only by the stops 9 that are arranged at an angular distance of approximately 30° on both sides of the attachment end of the rotor arm 3.

In a vane tip 10 that projects from the leading edge of the vane there is arranged a balance weight 11 that is connected rigidly to the vane 4, which ensures that the overall centre of gravity 12 of the mass of the body consisting of the vane 4 and the weight 11 is located in front of the axis 8, viewed in the direction of rotation.

The size and the effective lever arm of the balance weight 11 is so selected that the distance of the overall centre of gravity 12 to the axis 8 is at a maximum 20% of the average wing chord length of the vane 4.

As can be seen from FIG. 2, the vane 4 has an assymetrical airfoil section having an especially favourable efficiency factor. At the transition between the rotor arm 3 and the skin of the 4 there is, most expediently, a fairing 13.

The rotor 2 can be made with any number of vanes 4 and rotor arms 3, for example, in the form of a single-vane rotor. Even at low wind speeds the rotor 2 will begin to rotate on its own, without any help. It is obvious that the total weight of the vane 4 with the balance weight 11 is to be kept as low as possible in order to avoid excessively large gravitational forces. A simple change in the position of the balance weight 11 makes it possible to achieve an optimal match to the properties of the vane shape that is used in each instance.

The axis 8 can be within or just behind the leading edge of the vane. Depending on the vane shape (for example, positively or negatively), the axis 8 of the centre of the chord height of the vane 4 can be set further ahead of or behind the leading edge of the vane.

The embodiments of the invention in which an exclusive property of privilege is claimed are defined as follows:

1. A wind energy converter, comprising:
   a rotor rotatable about a vertical first axis,
   at least one rotor arm projecting transversely outwardly from said rotor,
   a substantially vertically oriented propulsive vane mounted adjacent an outer end of said rotor arm and arranged to react to air flow to produce rotation of said rotor in a direction of rotation, and
   rotary coupling means connecting said vane to said rotor arm for free rotary movement relative thereto about a substantially vertical second axis,
   said vane being configured asymmetrically about its chord and including a balance weight positioned ahead of said second axis with reference to said direction of rotation such that said vane defines a center of gravity disposed forwardly of said second axis with reference to said direction of rotation.

2. A wind energy converter according to claim 1, wherein said center of gravity is spaced forwardly of said second axis by a distance no greater than 20 percent of the average vane chord length.

3. A wind energy converter according to claim 1 including stop means for limiting the extent of rotation of said vane about said second axis.

4. A wind energy converter according to claim 1, wherein said vane includes a forwardly protruding nose, said balance weight disposed in said nose.

* * * * *